US010087747B2

(12) United States Patent
Rochford et al.

(10) Patent No.: US 10,087,747 B2
(45) Date of Patent: Oct. 2, 2018

(54) MANIPULATION OF MULTI-COMPONENT GEOPHONE DATA TO IDENTIFY DOWNHOLE CONDITIONS

(71) Applicant: Weatherford Technology Holdings, LLC, Houston, TX (US)

(72) Inventors: Brian Rochford, Calgary (CA); John Arbeau, Calgary (CA); Jim Rangel, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 15/423,794

(22) Filed: Feb. 3, 2017

(65) Prior Publication Data
US 2017/0145814 A1 May 25, 2017

Related U.S. Application Data

(62) Division of application No. 13/851,712, filed on Mar. 27, 2013, now Pat. No. 9,611,730.
(Continued)

(51) Int. Cl.
*E21B 34/06* (2006.01)
*E21B 47/10* (2012.01)
*G01V 1/40* (2006.01)
*E21B 34/00* (2006.01)

(52) U.S. Cl.
CPC ............ *E21B 47/101* (2013.01); *E21B 34/06* (2013.01); *G01V 1/40* (2013.01);
(Continued)

(58) Field of Classification Search
CPC .. E21B 34/06; E21B 2034/007; E21B 47/101; G01V 2210/36; G01V 2210/38; G01V 1/40
See application file for complete search history.

(56) References Cited

U.S. PATENT DOCUMENTS 2,483,770 A * 10/1949 Hildebrandt ......... G01V 11/005
181/401
3,170,152 A *  2/1965 Long .................... G01M 3/243
330/149
(Continued)

FOREIGN PATENT DOCUMENTS

EP     0943782 A2   9/1999
GB     2396011 A    6/2004

*Primary Examiner* — D. Andrews
*Assistant Examiner* — Ronald R Runyan
(74) *Attorney, Agent, or Firm* — Patterson + Sheridan, L.L.P.

(57) ABSTRACT

Methods and apparatus for using multi-component geophones and/or multi-component geophone arrays to measure flow-induced acoustic energy produced in wellbores are provided. With the use of the multi-component geophones, the measured acoustic energy may be resolved into its directional components. The computed directional energy components may be mathematically compared to numerically highlight ambient flow conditions (e.g., leaks in casing or other conduit, points of fluid entry/exit/restrictions between the casing and the formation). The use of an array of multi-component geophones allows for the use of geophone move-out curves to further identify acoustic energy source locations.

21 Claims, 5 Drawing Sheets

Related U.S. Application Data

(60) Provisional application No. 61/619,637, filed on Apr. 3, 2012.

(52) U.S. Cl.
CPC .... *E21B 2034/007* (2013.01); *G01V 2210/36* (2013.01); *G01V 2210/38* (2013.01)

(56) References Cited

U.S. PATENT DOCUMENTS

| | | | |
|---|---|---|---|
| 3,204,456 A * | 9/1965 | Welkowitz | G01F 1/665 |
| | | | 73/861.26 |
| 3,508,433 A * | 4/1970 | Bustin | F16L 55/28 |
| | | | 73/40.5 A |
| 4,114,721 A | 9/1978 | Glenn, Jr. | |
| 4,744,416 A * | 5/1988 | Bower | E21B 43/119 |
| | | | 166/253.1 |
| 5,212,354 A * | 5/1993 | Miller | G01V 11/005 |
| | | | 166/250.01 |
| 6,021,090 A | 2/2000 | Gaiser et al. | |
| 6,488,116 B2 | 12/2002 | Bailey | |
| 6,712,141 B1 | 3/2004 | Bussear et al. | |
| 2006/0133204 A1 | 6/2006 | Froelich | |
| 2010/0157737 A1 | 6/2010 | Miller et al. | |
| 2011/0188346 A1* | 8/2011 | Hull | E21B 47/101 |
| | | | 367/35 |
| 2015/0377661 A1* | 12/2015 | Edwards | G01D 18/002 |
| | | | 702/94 |

* cited by examiner

MANIPULATION OF MULTI-COMPONENT GEOPHONE DATA TO IDENTIFY DOWNHOLE CONDITIONS

CLAIM OF PRIORITY UNDER 35U.S.C. § 119

This application is a divisional of U.S. patent application Ser. No. 13/851,712, filed Mar. 27, 2013 and entitled "MANIPULATION OF MULTI-COMPONENT GEOPHONE DATA TO IDENTIFY DOWNHOLE CONDITIONS," which claims benefit of U.S. Provisional Patent Application No. 61/619,637, filed Apr. 3, 2012, both of which are herein incorporated by reference in their entireties.

BACKGROUND OF THE INVENTION

Field of the Invention

Embodiments of the present invention generally relate to downhole production of hydrocarbons. More particularly, embodiments of the invention relate to manipulating data collected using one or more multi-component geophones and/or multi-component geophone arrays in an effort to determine certain downhole flow conditions.

Description of the Related Art

In situ measurement of the passive seismic wavefield is becoming an increasingly common geophysical surveying procedure. This measurement, known commonly as the Noise Log or Microseismic Survey, furnishes the opportunity to investigate ambient noise levels in existing wellbores. These ambient noise levels are often indicative of gas/fluid migration in the vicinity of the wellbore (Noise Log) or completion operations in nearby wellbores (Microseismic Survey).

SUMMARY OF THE INVENTION

Embodiments of the invention generally relate to using multi-component geophones and/or multi-component geophone arrays and manipulating data collected therewith in an effort to measure flow-induced acoustic energy and to determine certain flow conditions.

One embodiment of the invention is a method for determining a presence of fluid flowing in an annulus between a lateral surface of a wellbore and a conduit disposed in the wellbore. The method generally includes measuring directional noise components at a plurality of locations in the wellbore using one or more multi-component geophones and determining the presence of the fluid in the annulus based on the measured directional noise components.

Another embodiment of the invention is a method for detecting a presence of a leak in a conduit disposed in a wellbore. The method generally includes measuring one or more first noise values at a plurality of locations in the wellbore using one or more geophones, each geophone having a movable arm, wherein the arm is positioned such that the geophone is relatively less acoustically coupled to the conduit; measuring one or more second noise values at the plurality of locations in the wellbore using the one or more geophones, wherein the arm of each geophone is positioned such that the geophone is relatively more acoustically coupled to the conduit; and detecting the presence of the leak based on differences between the first and second noise values.

Yet another embodiment of the invention is a method for confirming shifting of a first sliding sleeve disposed in a wellbore. The method generally includes measuring an audio signal of the wellbore using a multi-component geophone during a period when the first sliding sleeve is supposed to be shifting; and comparing the measured audio signal to a sound signature of a second sliding sleeve being shifted to confirm whether the first sliding sleeve has actually shifted.

Yet another embodiment of the invention is a processing system for determining a presence of fluid flowing in an annulus between a lateral surface of a wellbore and a conduit disposed in the wellbore. The processing system is generally configured to receive directional noise components measured by one or more multi-component geophones at a plurality of locations in the wellbore and to determine the presence of the fluid in the annulus based on the received directional noise components.

Yet another embodiment of the invention is a processing system for detecting a presence of a leak in a conduit disposed in a wellbore. The processing system is generally configured to receive one or more first noise values measured by one or more geophones at a plurality of locations in the wellbore, each geophone having a movable arm, wherein the arm is positioned such that the geophone is relatively less acoustically coupled to the conduit; to receive one or more second noise values measured by the one or more geophones at the plurality of locations in the wellbore, wherein the arm of each geophone is positioned such that the geophone is relatively more acoustically coupled to the conduit; and to detect the presence of the leak based on differences between the first and second noise values.

Yet another embodiment of the invention is a processing system for confirming shifting of a first sliding sleeve disposed in a wellbore. The processing system is generally configured to receive an audio signal of the wellbore determined by a multi-component geophone during a period when the first sliding sleeve is supposed to be shifting and to compare the audio signal to a sound signature of a second sliding sleeve being shifted to confirm whether the first sliding sleeve has actually shifted.

Yet another embodiment of the invention is a system for determining a presence of fluid flowing in an annulus between a lateral surface of a wellbore and a conduit disposed in the wellbore. The system generally includes one or more multi-component geophones configured to measure directional noise components at a plurality of locations in the wellbore and a processing unit configured to determine the presence of the fluid in the annulus based on the measured directional noise components.

Yet another embodiment of the invention is a system for detecting a presence of a leak in a conduit disposed in a wellbore. The system generally includes one or more geophones, wherein each geophone has a movable arm and is configured to measure one or more first noise values at a plurality of locations in the wellbore, wherein the arm of each geophone is positioned such that the geophone is relatively less acoustically coupled to the conduit; and to measure one or more second noise values at the plurality of locations in the wellbore, wherein the arm of each geophone is positioned such that the geophone is relatively more acoustically coupled to the conduit; and a processing unit configured to detect the presence of the leak based on differences between the first and second noise values.

Yet another embodiment of the invention is a system for confirming shifting of a first sliding sleeve disposed in a wellbore. The system generally includes a multi-component geophone configured to measure an audio signal of the wellbore during a period when the first sliding sleeve is supposed to be shifting and a processing unit configured to compare the measured audio signal to a sound signature of a second sliding sleeve being shifted to confirm whether the first sliding sleeve has actually shifted.

Yet another embodiment of the invention is a computer-readable medium for determining a presence of fluid flowing in an annulus between a lateral surface of a wellbore and a conduit disposed in the wellbore. The computer-readable medium generally includes instructions executable by a processing unit to measure directional noise components at a plurality of locations in the wellbore using one or more multi-component geophones and to determine the presence of the fluid in the annulus based on the measured directional noise components.

Yet another embodiment of the invention is a computer-readable medium for detecting a presence of a leak in a conduit disposed in a wellbore. The computer-readable medium generally includes instructions executable by a processing unit to measure one or more first noise values at a plurality of locations in the wellbore using one or more geophones, each geophone having a movable arm, wherein the arm is positioned such that the geophone is relatively less acoustically coupled to the conduit; to measure one or more second noise values at the plurality of locations in the wellbore using the one or more geophones, wherein the arm of each geophone is positioned such that the geophone is relatively more acoustically coupled to the conduit; and to detect the presence of the leak based on differences between the first and second noise values.

Yet another embodiment of the invention is a computer-readable medium for confirming shifting of a sliding sleeve disposed in a wellbore. The computer-readable medium generally includes instructions executable by a processing unit to measure an audio signal of the wellbore using a multi-component geophone during a period when the sliding sleeve is supposed to be shifting; and to compare the measured audio signal to a sound signature of another sliding sleeve being shifted to confirm whether the sliding sleeve has actually shifted.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope for the invention may admit to other equally effective embodiments.

DETAILED DESCRIPTION

Embodiments of the invention generally relate to using multi-component geophones and/or multi-component geophone arrays and manipulating data collected therewith in an effort to measure flow-induced acoustic energy produced in wellbores. With the use of the multi-component geophones, the measured acoustic energy at any depth in the wellbore may be resolved into its directional components. The computed directional energy components may be mathematically compared to numerically highlight ambient flow conditions (e.g., leaks in casing, points of fluid entry/exit/restrictions between the casing and the formation). The use of an array of multi-component geophones allows for the use of geophone move-out curves to further identify acoustic energy source locations.

Example Well Completion

Figure 1:
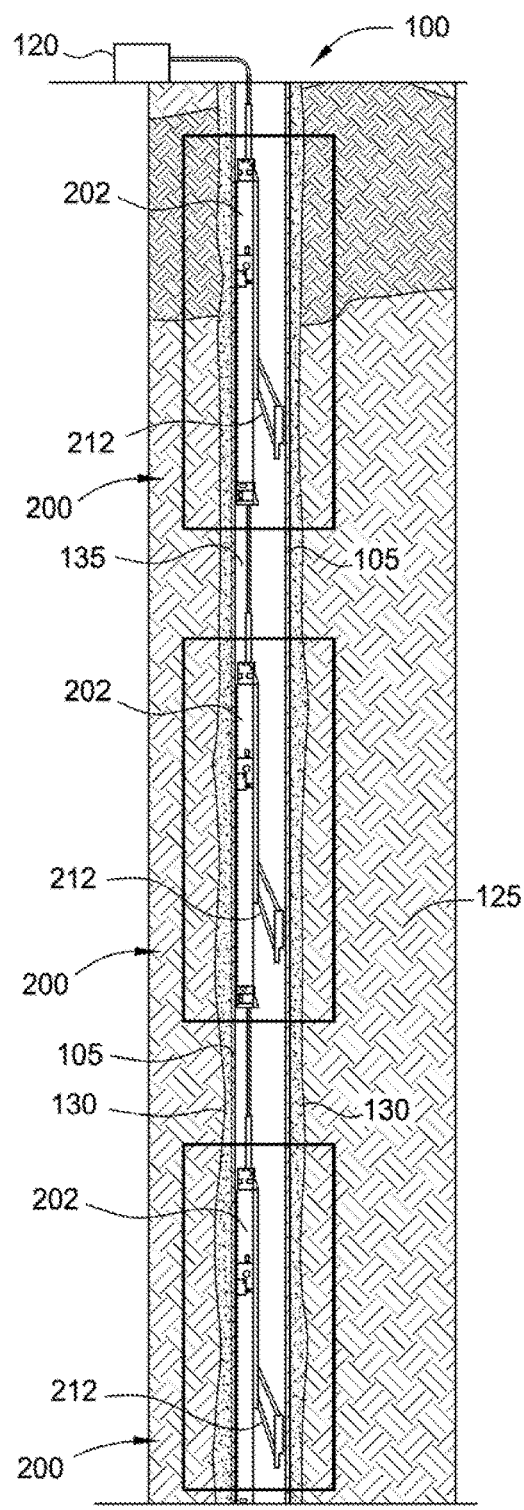
FIG. 1 illustrates a multi-component geophone array disposed in a wellbore, according to embodiments of the invention.

FIG. 1 depicts an example completion for a well 100, which may have been drilled down to a subsurface production zone. The well 100 is typically lined with a string of casing 105 that is secured to the surrounding formations 125 by a cementation operation. In this operation, cement may be poured into an annulus 130 between the lateral surfaces of the wellbore and the casing 105. Production tubing (not shown) may be deployed in the casing 105 for recovering hydrocarbons in a controlled manner from one or more reservoirs.

A source/sensing/data collection apparatus 120, which may include one or more processing units, may be located at the surface of the well 100. The apparatus 120 may be coupled to one or more instruments, sensors, and/or tools located downhole via a cable 135, which may be an electrical and/or an optical cable, for example. Using the cable 135, the apparatus 120 may transmit control signals to the tools and instruments, transmit source signals to the sensors, and/or receive signals from the instruments and sensors. The apparatus 120 may also process and/or record the signals received from the downhole instruments and sensors.

Many existing oil and gas wells experience issues with a lack of zonal isolation of the fluids associated with the geological formations 125 located behind the casing 105. These fluids include oil, gas, and water. Fluids often migrate from one geologic formation to another (or to the surface). This migration can occur vertically along the annulus 130 between the casing 105 and the formations 125. Operators attempt to eliminate this migration by placing cement in the annulus 130 between the casing 105 and the formations 125 (either as part of the casing installation program or as a remedial measure after the fact). Occasionally this cement may not provide an effective vertical barrier against fluid migration. When this situation occurs, it becomes important to identify the presence of fluid movement behind the casing 105 and determine the flow path (e.g., source formation and final destination of the fluid flow). Depending on the location of the well, local regulations often demand identifying the source of the flow and performing remedial action. This remedial action is designed to confine any flow to its geological source formation.

Another problem in the industry occurs when the casing 105, production tubing, or other conduit in a well 100 develops a leak. These leaks are often the result of mechanical damage or wear, corrosion, or improperly connected casing/tubing joints. One of the functions of casing/tubing is to provide both hydraulic and fluid isolation between the interior/exterior areas of the casing/tubing. When a leak condition exists, fluids may pass through the wall of the casing/tubing. This can create both safety and production concerns for the operator.

Furthermore, fracture completion systems utilizing mechanical set packers and sleeves are now quite popular in the industry. Many of these systems utilize a "ball and sleeve" system to selectively expose different sections of a well to high pressure fracture fluid. The activating ball in these systems is usually conveyed from the surface downhole with the aid of high pressure fluid. Once downhole, the ball creates a hydraulic seal with its respective sleeve, causing a shear pin to break and the sleeve to shift open. This sleeve shifting allows high pressure fracture fluid to be routed through a port system to the formation located between the packers. Problems arise when the sleeve does not properly shift open.

Historically operators have contracted service companies to provide noise tools and/or temperature tools to identify migrating fluid source locations and their associated flow paths. Traditional noise tools generally include a single microphone/hydrophone which digitally records the background noise present at various depths inside the casing 105. These tools record the total background noise level at any position in the wellbore with no consideration given to the directionality of the background noise. Conventional temperature sensors include a digital thermometer which records the wellbore temperature at various depths inside the casing 105. These readings are typically used to produce a vertical temperature profile log of the area inside the casing 105.

Casing/tubing leak detection historically has been first identified with the use of pressure drop-off tests. With these tests, the casing/tubing string is pressured up appropriately to determine if the pressure integrity has been compromised. If there is a problem indicated, the next step often involves the same noise and/or temperature tools mentioned above. Various casing/tubing inspection tools (e.g., magnetic flux leakage and mechanical multi-arm caliper tools) designed to measure the inside diameter and wall thickness of the casing/tubing, for example, may also be utilized.

Confirmation of sleeve shifting for fracture completion systems has historically been inferred through the interpretation of wellhead pressures recorded during the fracture pumping. This data is normally supplied by the company performing the hydraulic fracture service on the well. Relying on wellhead pressure curves to confirm sleeve shifting is open to considerable interpretation and is often not possible.

Accordingly, what is needed are techniques and apparatus for intelligently collecting and manipulating data in an effort to measure flow-induced acoustic energy produced in wellbores and to determine certain flow conditions.

Example Multi-Component Geophone

To measure acoustic signals, the sensor(s) deployed downhole in the well 100 may include one or more geophones, as depicted by the array of geophones shown in FIG. 1. Each geophone in the array shown is a multi-component geophone 200, with each component having maximum sensitivity to incoming acoustic energy along its axis of orientation. For some embodiments, the array of geophones may be lowered into the casing 105 after the production tubing has been removed (as shown in FIG. 1), while in other embodiments, the array may be lowered into the production tubing. The geophones in the array may be strategically spaced to maximize, or at least increase, noise detection ability. For other embodiments, a single geophone may be lowered into the well 100 (e.g., into the casing 105 or the production tubing) and positioned at various desired locations for taking noise readings at each of these locations.

Figure 2:
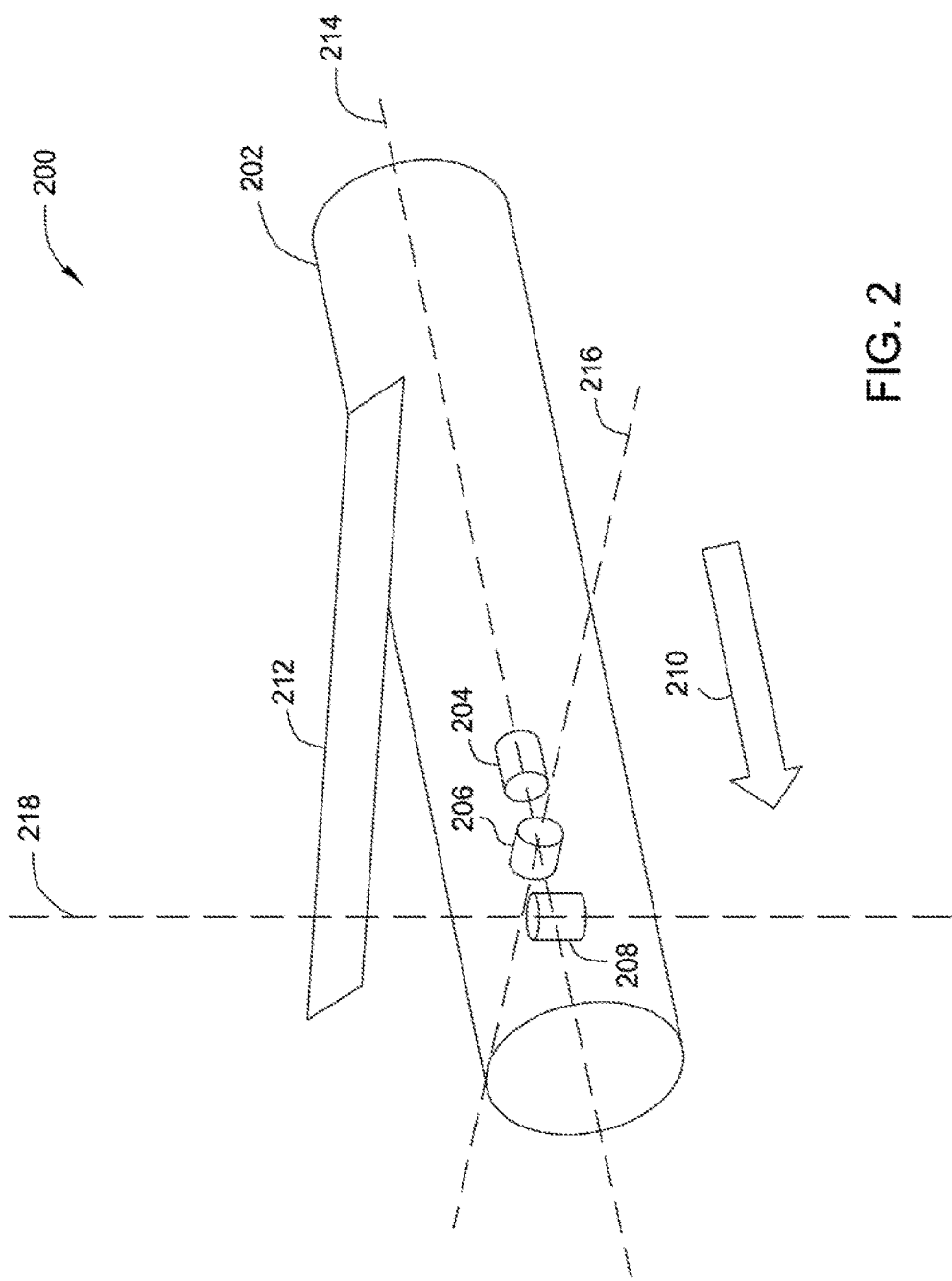
FIG. 2 illustrates an example multi-component geophone, according to embodiments of the invention.

FIG. 2 illustrates an example multi-component geophone 200, according to embodiments of the present invention. The multi-component geophone 200 is capable of recording and rendering background noise levels in multiple directions, which may be orthogonal (e.g., 2 horizontal components (commonly referred to as the X and Y directions) and 1 vertical component (commonly referred to as the Z direction)). The multi-component geophone 200 comprises a geophone tool body 202, which houses multiple geophone components 204, 206, 208. With the downhole direction of the well 100 indicated by arrow 210, the components may be oriented in different directions to measure the various directional noise components desired. As illustrated in FIG. 2, Z component 204 is oriented along the Z axis 214 of the geophone tool body 202 and of the well. Y component 206 is oriented along the Y axis 216 of the geophone tool body 202, and X component 208 is oriented along the X axis 218 of the geophone tool body 202. The multi-component geophone 200 may include any combination of multiple components 204, 206, 208, which may also include combinations with additional components (not shown) oriented in other directions.

The multi-component geophone 200 may also employ a movable backup arm 212 (also known as a clamp arm or locking arm), which may be used to force the geophone against the wall of a conduit in which the geophone is disposed. For example, the backup arms 212 of the geophones 200 disposed in the casing 105 illustrated in FIG. 1 are extended, forcing the geophones into the casing wall. Noise readings may be taken with the backup arm 212 closed (i.e., geophone not, or at least relatively less, acoustically coupled to the casing 105) or with the backup arm 212 open (i.e., geophone is, or is at least relatively more, acoustically coupled to the casing). In FIG. 2, the backup arm 212 is shown in the open position, whereas the arm may lie against the outer surface of the geophone tool body 202 when closed.

Software executed in the source/sensing/data collection apparatus 120, for example, may compute a numerical value representative of the total noise level in each of these component directions. A digital time versus amplitude record for each geophone component may be recorded and analyzed. The time record may be transformed to a frequency spectrum, which may be further divided into frequency bins. The total root-mean-square (RMS) noise value may be computed for the entire spectrum and for the individual bins. The differences between (and ratios of) the RMS values for each geophone component may be compared bin by bin to determine the dominant direction of incoming acoustic energy. Additional time-based records for each geophone component may be analyzed, and the rate of change of the per-bin RMS values may be computed to quantify the time variance of the recorded acoustic energy. If the array is repositioned at another depth, the individual geophone component RMS values may be recomputed, and a comparison is made to the previous depth data. The change in recorded RMS values versus depth may be calculated for each geophone component. Analysis of the computed values provides confirmation of the existence of fluid movement and is indicative of the direction of the fluid movement relative to the sensors.

Example Identification of Fluid Migration

For fluid migration behind the casing 105 (i.e., in the annulus 130), the multi-component geophone noise readings taken with the backup arms 212 open are most useful. Readings may be taken at many depths along the wellbore. Comparison of the horizontal (i.e., the X and Y) and vertical (i.e., the Z) noise components at various depths to surrounding noise levels may be indicative of the presence of fluid flow (inferred from increased noise levels). For geophone readings taken close to the fluid flow source, the direction to the flow source may be indicated by the ratio of vertical to horizontal noise. When any particular geophone in the array is (or when a geophone has been moved) opposite the flow source, the geophone will record a maximum horizontal noise component, such that the location of the source may be identified. In wells with sustained vertical flow occurring in the annulus 130 between the casing 105 and the formation 125, there will be an increase in the recorded acoustic energy measured by the vertical component geophone compared to the acoustic energy measured by the horizontal component geophone.

By employing an array of geophones, any detected fluid flow sources of sufficient amplitude may be simultaneously detected by multiple geophones. The first arrival move-out of any discrete acoustic events associated with the source measured by the array is indicative of the source's physical location.

Figure 3:
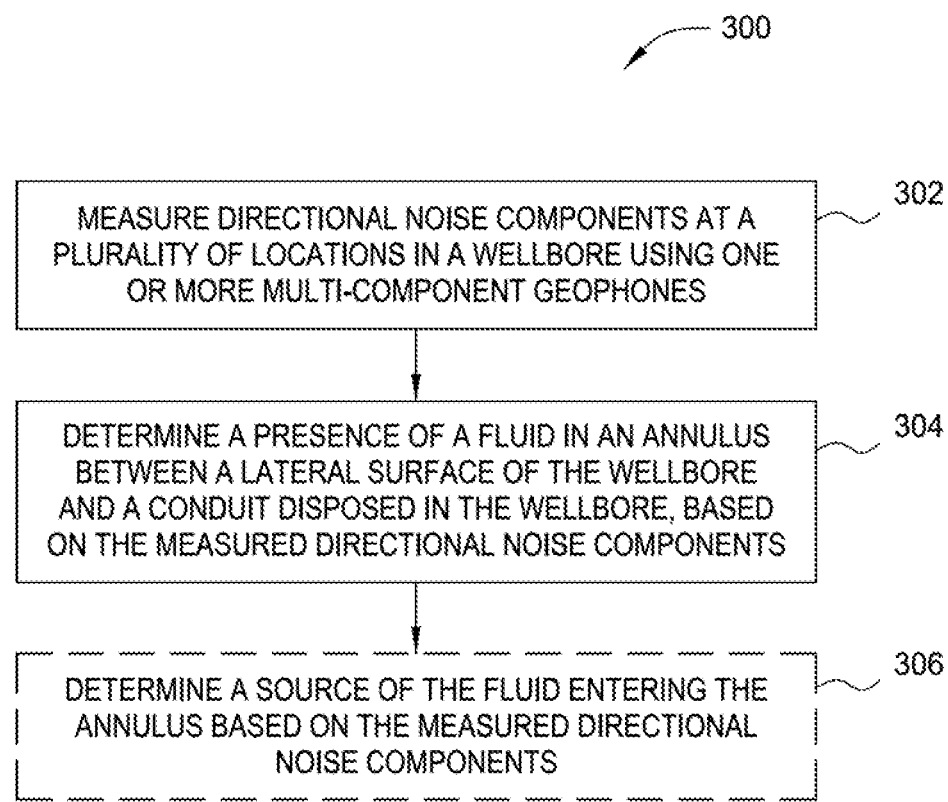
FIG. 3 is a flow diagram of example operations for identifying fluid migration in the annulus of a wellbore, according to embodiments of the invention.

FIG. 3 is a flow diagram of example operations 300 for determining a presence of fluid flowing in an annulus between a lateral surface of a wellbore and a conduit (e.g., casing 105) disposed in the wellbore, according to embodiments of the invention. The operations 300 may be controlled or performed, at least in part, by the source/sensing/data collection apparatus 120, for example. At least a portion of the operations 300 may be stored in a memory associated with the apparatus 120 or on another non-transitory computer-readable storage medium (e.g., random access memory (RAM), read-only memory (ROM), electrically erasable programmable read-only memory (EEPROM), flash memory, a hard disk, a removable disk, a CD-ROM, and the like).

The operations 300 may begin, at 302, by measuring directional noise components at a plurality of locations in the wellbore using one or more multi-component geophones (e.g., geophone 200). At 304, the presence of the fluid in the annulus may be determined based on the measured directional noise components. For some embodiments, determining the presence of the fluid at 304 involves detecting a higher directional noise component measured at one of the locations compared to corresponding directional noise components measured at other locations in the plurality of locations.

According to some embodiments, the operations 300 may optionally also include determining a source of the fluid entering the annulus based on the measured directional noise components. In this case, the measuring at 302 may include measuring a vertical noise component and at least one horizontal noise component at each of the locations. Determining the source may involve determining a direction to the source at each of the locations based on a comparison of the vertical and horizontal noise components. For some embodiments, one of the locations associated with a maximum horizontal noise component may be determined to be opposite to the source of the fluid.

According to some embodiments, the one or more multi-component geophones are disposed in the conduit. The conduit may be casing, production tubing, or pipe, for example.

For some embodiments, each of the one or more multi-component geophones includes a movable arm (e.g., arm 212). This arm may be positioned such that each geophone is acoustically coupled to the conduit (e.g., the arm may be open and touching the conduit).

According to some embodiments, the one or more multi-component geophones include an array of multi-component geophones. For other embodiments, the one or more multi-component geophones include a single multi-component geophone that is moved to the plurality of locations to measure the directional noise components. Each component in each multi-component geophone may have maximum sensitivity to incoming acoustic energy along an axis of orientation for the component.

Example Leak Detection

For instances where there is fluid flow inside of a conduit (e.g., casing 105 or production tubing), readings may be taken at various depths with the backup arms 212 open and with the backup arms closed inside the conduit, in either order. When the backup arms 212 are closed, the geophones 200 may be extremely sensitive to fluid migration inside the conduit, especially in the direction parallel to the wellbore trajectory (e.g., the Z axis 214). When the backup arms 212 are open, the geophones 200 are acoustically coupled to the conduit, and the effects of fluid movement inside the conduit may be minimized, or at least substantially reduced. The differential between these two readings (i.e., between the backup arms being open and closed) will be indicative of fluid migration inside of the conduit and can be used to identify the point of fluid entry.

For the common scenario where fluid entering the casing 105 (or other conduit) then migrates upwards, background noise levels above the fluid entry point (e.g., at a shallower depth than the leak) may be significantly higher when readings are taken with the backup arms 212 closed versus open. Differential readings taken below the fluid entry point (e.g., at a greater depth than the leak) may likely show a smaller difference than those taken above the fluid entry point.

Figure 4:
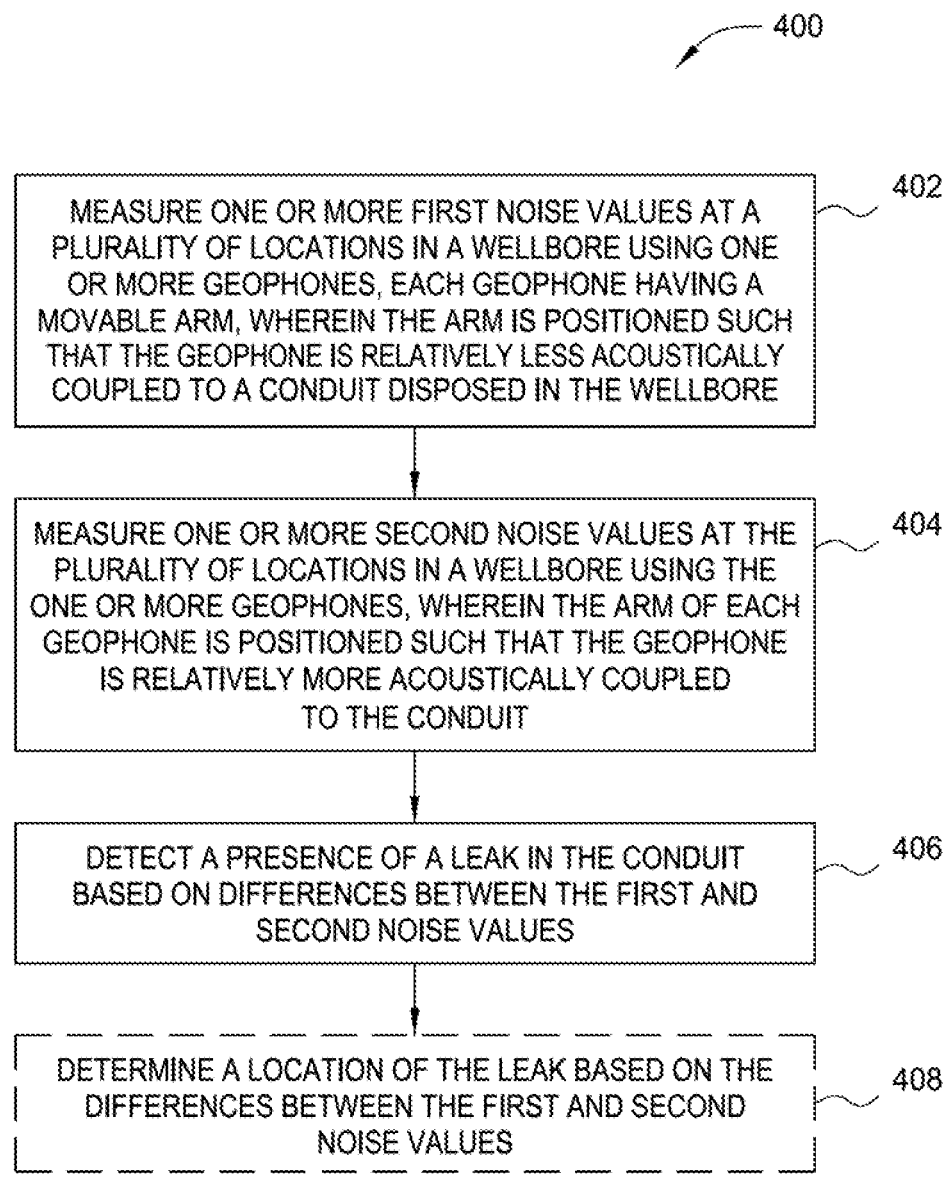
FIG. 4 is a flow diagram of example operations for detecting a leak in a conduit, according to embodiments of the invention.

FIG. 4 is a flow diagram of example operations 400 for detecting a presence of a leak in a conduit disposed in a wellbore, according to embodiments of the invention. The operations 400 may be controlled or performed, at least in part, by the source/sensing/data collection apparatus 120, for example. At least a portion of the operations 400 may be stored in a memory associated with the apparatus 120 or on another non-transitory computer-readable storage medium.

The operations 400 may begin, at 402, by measuring one or more first noise values at a plurality of locations in the wellbore using one or more geophones (e.g., geophones 200). Each geophone has a movable arm (e.g., arm 212), which is positioned such that the geophone is relatively less acoustically coupled to the conduit (e.g., the arm is closed or is not touching the conduit).

At 404, one or more second noise values are measured at the plurality of locations in the wellbore using the one or more geophones. For measuring the second noise values, the arm of each geophone is positioned such that the geophone is relatively more acoustically coupled to the conduit (e.g., the arm is open and is touching the conduit).

At 406, the presence of the leak is detected based on differences between the first and second noise values. For some embodiments, the operations 400 may further include determining a location of the leak based on the differences between the first and second noise values. The differences in the first and second noise values above the location of the leak may be significantly higher than the differences in the first and second noise values below the location of the leak.

For some embodiments, the one or more geophones are disposed in the conduit. The conduit may be casing, production tubing, or pipe, for example.

According to some embodiments, the one or more geophones include an array of multi-component geophones. For other embodiments, the one or more geophones include a single geophone that is moved to the plurality of locations to measure the first and second noise values.

Example Confirmation of Sliding Sleeve Activation

For confirmation of sleeve shifting during completion operations, the action of the sleeve shifting may generate a microseismic event, detectable using the multi-component geophone or geophone array described above (e.g., which may be strategically located in a nearby monitoring well). Software readily exists to confirm the action of the respective sleeve shifting (e.g., by confirming event arrivals at the geophone(s), which can be processed to confirm the physical location of the sleeve-shifting event). It is also possible to use commercially available software to produce an audio file of the sleeve-shifting event utilizing the data recorded by the geophone array. Sleeve shifting has a readily identifiable sound signature which can be compared to the audio file produced for confirmation of the sleeve shifting having occurred.

Figure 5:
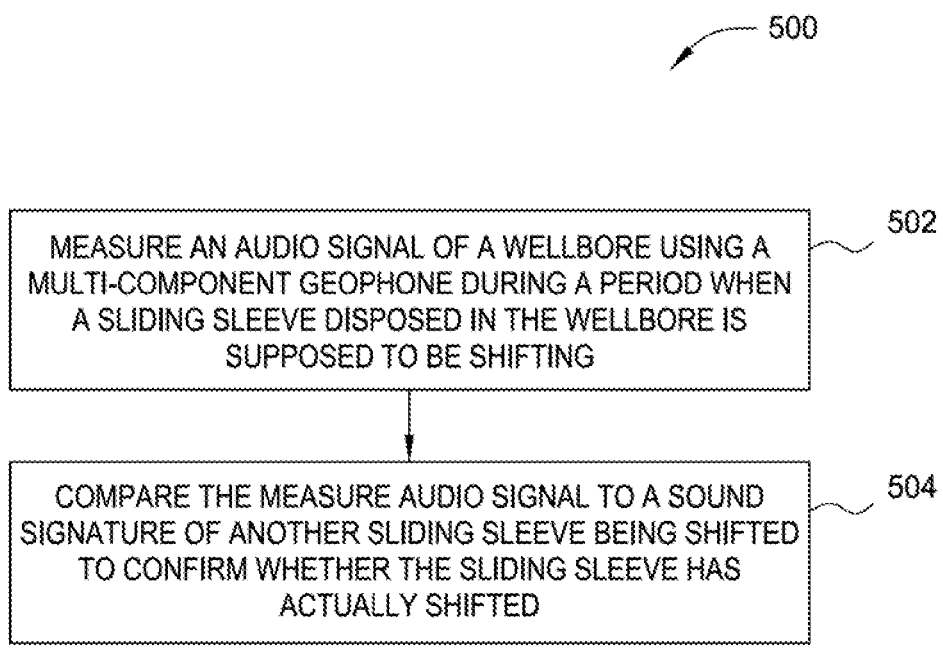
FIG. 5 is a flow diagram of example operations for identifying activation of a sliding sleeve, according to embodiments of the invention.

FIG. 5 is a flow diagram of example operations 500 for confirming shifting of a first sliding sleeve disposed in a wellbore, according to embodiments of the invention. The operations 500 may be controlled or performed, at least in part, by the source/sensing/data collection apparatus 120, for example. At least a portion of the operations 500 may be stored in a memory associated with the apparatus 120 or on another non-transitory computer-readable storage medium.

The operations 500 may begin, at 502, by measuring an audio signal of the wellbore using a multi-component geophone (e.g., geophone 200) during a period when the first sliding sleeve is supposed to be shifting. At 504, the measured audio signal may be compared to a sound signature of a second sliding sleeve being shifted in an effort to confirm whether the first sliding sleeve has actually shifted. The sound signature of the second sliding sleeve may have been prerecorded and stored in a memory associated with the source/sensing/data collection apparatus 120. For some embodiments, the first and second sliding sleeves may be the same sliding sleeve (i.e., the sound signature is an audio signal of the first sliding sleeve).

For some embodiments, movement of the sliding sleeve may generate a microseismic event that is detected by the multi-component geophone.

For some embodiments, the multi-component geophone is located in a different wellbore than the wellbore having the sliding sleeve disposed therein. For other embodiments, the multi-component geophone is located in the same wellbore as the wellbore with the sliding sleeve.

CONCLUSION

As mentioned above, traditional noise tools do not employ the ability to resolve background noise into its directional vector components. However, using multi-component geophones provides the ability to determine the source direction from the directional noise data recorded. Having an array of geophones straddling a fluid flow source point may also allow for source location based on the geophone move-out curves.

Having the ability to record data with the geophone backup arms open or closed allows for thorough evaluation of the background noise profile both inside the conduit (i.e., with the backup arms closed) and behind the conduit (i.e., with the backup arms open).

Using an audio file (e.g., in conjunction with microseismic processing) to confirm sleeve shifting for an open hole completion system provides positive evidence as to the status of the shifting sleeve. When these sleeves do shift open, they may produce a characteristic sound pattern which can be detected by a multi-component geophone and used in conjunction with microseismic processing to confirm the status of the sleeve.

While the foregoing is directed to embodiments of the present invention, other and further embodiments of the invention may be devised without departing from the basic scope thereof, and the scope thereof is determined by the claims that follow.

The invention claimed is:

1. A method for detecting a presence of a leak in a conduit disposed in a wellbore, comprising:
   measuring one or more first noise values at a plurality of locations in the wellbore using one or more geophones, each geophone having a body and a movable arm configured to extend and retract with respect to the body, wherein:
   the arm is positioned in a first position such that the geophone is relatively less acoustically coupled to the conduit to measure the first noise values; and
   the body comprises at least one sensory component of the geophone disposed internal to the body;
   measuring one or more second noise values at the plurality of locations in the wellbore using the one or more geophones, wherein the arm of each geophone is positioned in a second position such that the geophone is relatively more acoustically coupled to the conduit to measure the second noise values; and
   detecting the presence of the leak based on differences between the first and second noise values.

2. The method of claim 1, further comprising determining a location of the leak based on the differences between the first and second noise values.

3. The method of claim 2, wherein the differences in the first and second noise values above the location of the leak are significantly higher than the differences in the first and second noise values below the location of the leak.

4. The method of claim 1, wherein the one or more geophones are disposed in the conduit.

5. The method of claim 1, wherein the conduit comprises casing.

6. The method of claim 1, wherein the one or more geophones comprise an array of multi-component geophones.

7. The method of claim 1, wherein the one or more geophones comprise a single geophone that is moved to the plurality of locations to measure the first and second noise values.

8. The method of claim 1, wherein the first position comprises a retracted position of the arm with respect to a longitudinal axis of the body and wherein the second position comprises an extended position of the arm with respect to the longitudinal axis of the body.

9. A processing system for detecting a presence of a leak in a conduit disposed in a wellbore, configured to:
   receive one or more first noise values measured by one or more geophones at a plurality of locations in the wellbore, each geophone having a body and a movable arm configured to extend and retract with respect to the body, wherein:

the arm is positioned in a first position such that the geophone is relatively less acoustically coupled to the conduit; and the body comprises at least one sensory component of the geophone disposed internal to the body;

receive one or more second noise values measured by the one or more geophones at the plurality of locations in the wellbore, wherein the arm of each geophone is positioned in a second position such that the geophone is relatively more acoustically coupled to the conduit; and detect the presence of the leak based on differences between the first and second noise values.

10. The processing system of claim 9, further configured to determine a location of the leak based on the differences between the first and second noise values.

11. The processing system of claim 10, wherein the differences in the first and second noise values above the location of the leak are significantly higher than the differences in the first and second noise values below the location of the leak.

12. The processing system of claim 9, wherein the first position comprises a retracted position of the arm with respect to a longitudinal axis of the body and wherein the second position comprises an extended position of the arm with respect to the longitudinal axis of the body.

13. A system for detecting a presence of a leak in a conduit disposed in a wellbore, comprising:

one or more geophones, wherein:

each geophone has a body and a movable arm configured to extend and retract with respect to the body;

the body comprises at least one sensory component of the geophone disposed internal to the body; and each geophone is configured to:

measure one or more first noise values at a plurality of locations in the wellbore, wherein the arm of each geophone is positioned in a first position such that the geophone is relatively less acoustically coupled to the conduit to measure the first noise values; and measure one or more second noise values at the plurality of locations in the wellbore, wherein the arm of each geophone is positioned in a second position such that the geophone is relatively more acoustically coupled to the conduit to measure the second noise values; and a processing unit configured to detect the presence of the leak based on differences between the first and second noise values.

14. The system of claim 13, wherein the processing unit is further configured to determine a location of the leak based on the differences between the first and second noise values.

15. The system of claim 14, wherein the differences in the first and second noise values above the location of the leak are significantly higher than the differences in the first and second noise values below the location of the leak.

16. The system of claim 13, wherein the one or more geophones are disposed in the conduit.

17. The system of claim 13, wherein the conduit comprises casing.

18. The system of claim 13, wherein the one or more geophones comprise an array of multi-component geophones.

19. The system of claim 13, wherein the one or more geophones comprise a single geophone that is moved to the plurality of locations to measure the first and second noise values.

20. The system of claim 13, wherein the first position comprises a retracted position of the arm with respect to a longitudinal axis of the body and wherein the second position comprises an extended position of the arm with respect to the longitudinal axis of the body.

21. The system of claim 13, wherein the movable arm lacks another sensory component of the geophone.

* * * * *